Sept. 17, 1957 W. G. SMITH 2,806,463
BARBECUE GRILL AND OVEN
Filed Dec. 30, 1954 3 Sheets-Sheet 1
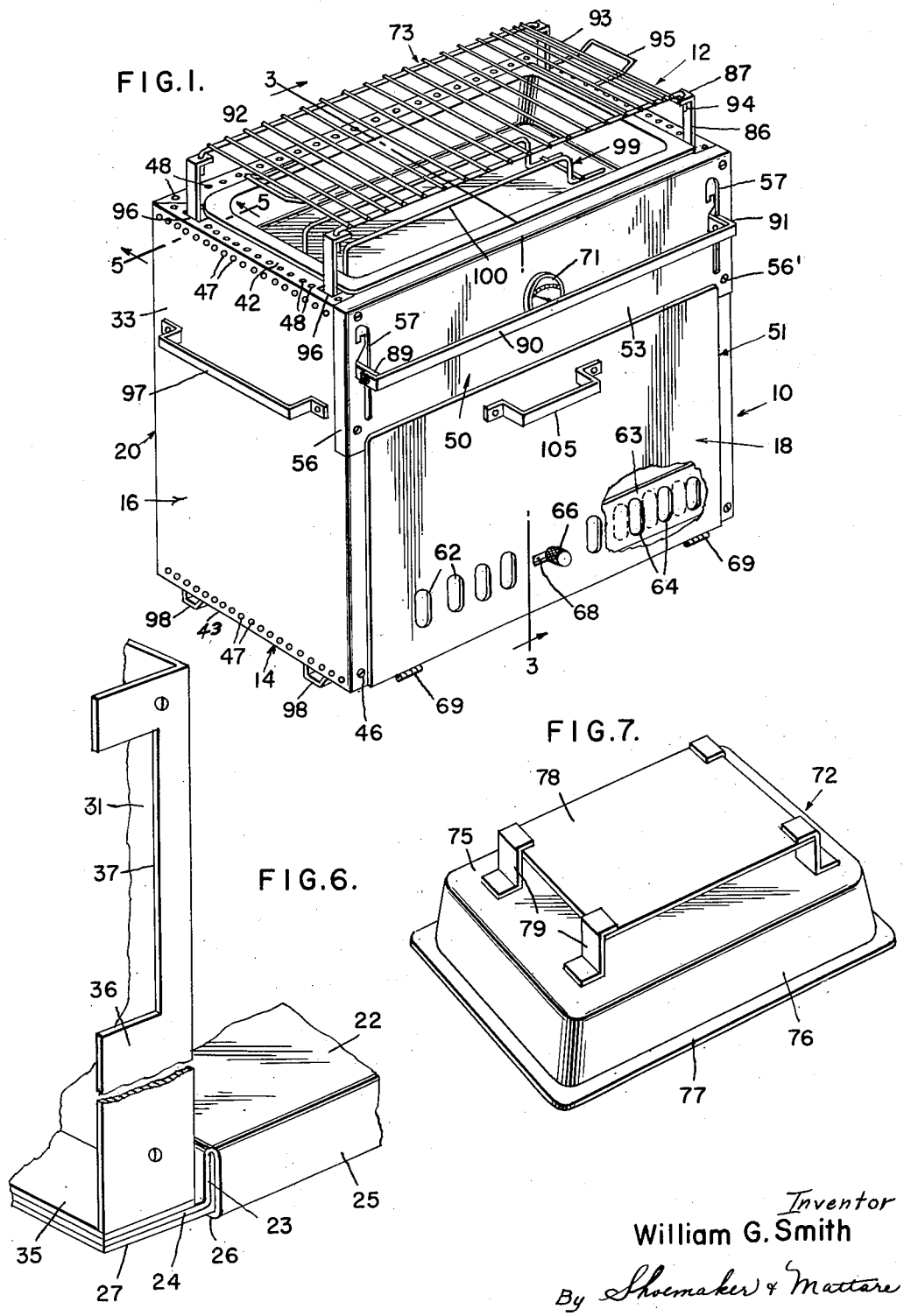
Inventor
William G. Smith
By Shoemaker & Mattare
ATTYS.

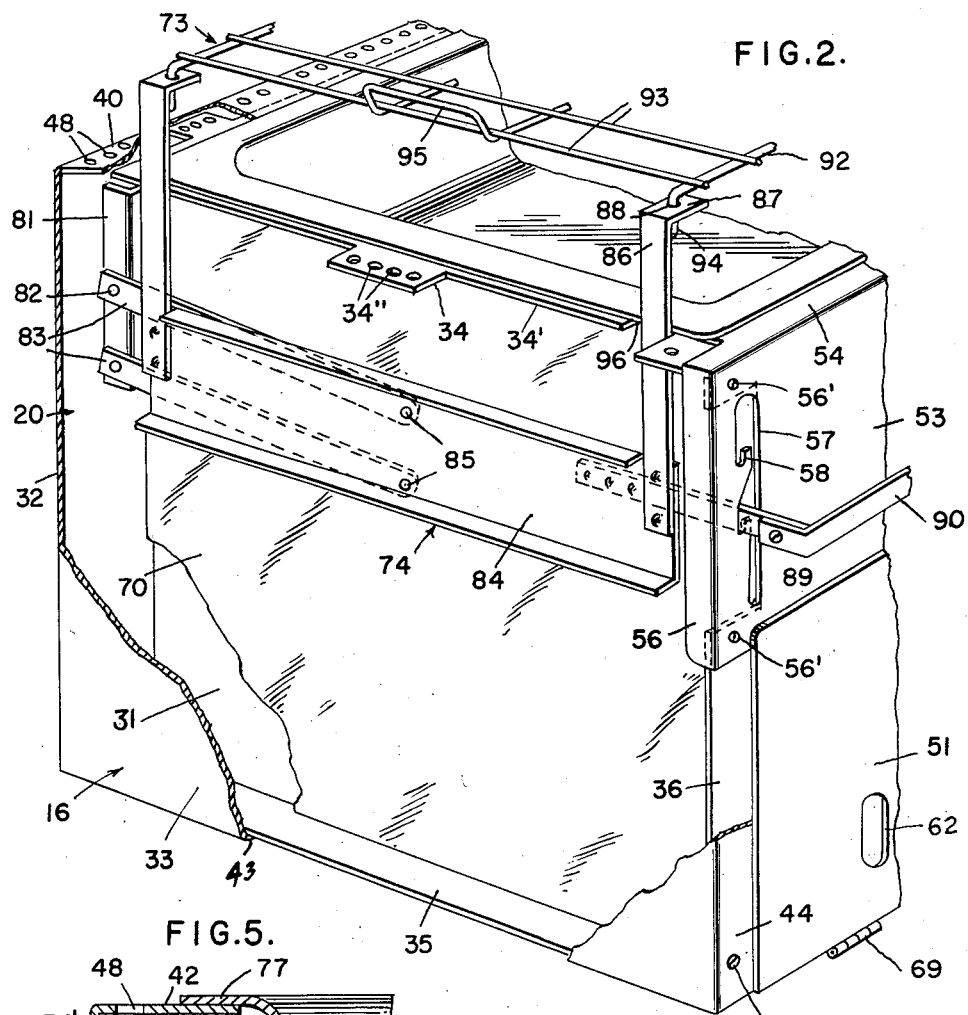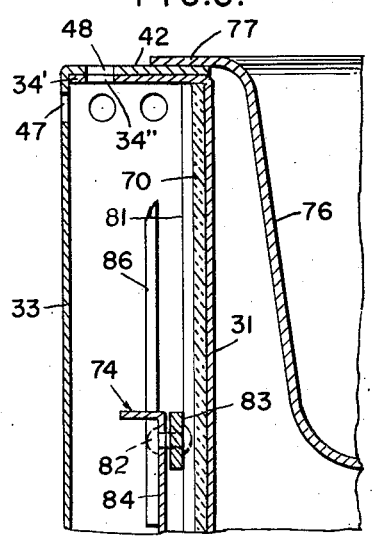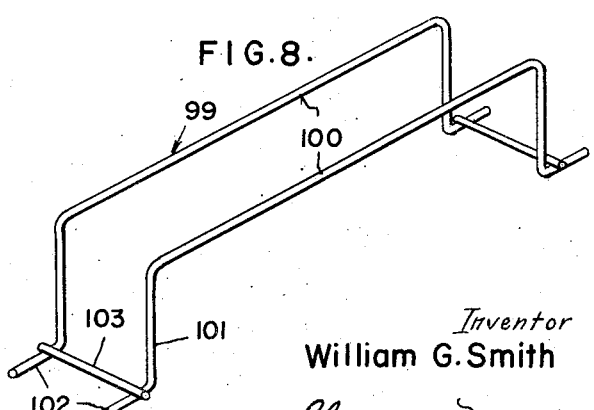

Sept. 17, 1957  W. G. SMITH  2,806,463
BARBECUE GRILL AND OVEN
Filed Dec. 30, 1954  3 Sheets-Sheet 3

Inventor
William G. Smith
By Shoemaker & Mattare
ATTYS.

United States Patent Office 2,806,463
Patented Sept. 17, 1957

2,806,463

BARBECUE GRILL AND OVEN

William G. Smith, Chattanooga, Tenn., assignor to Stainless Metal Products, Inc., Chattanooga, Tenn., a corporation of Tennessee Application December 30, 1954, Serial No. 478,852

2 Claims. (Cl. 126—25)

This invention relates generally to cooking apparatus and is directed particularly to improvements in barbecue grills and ovens.

The increasing interest in outdoor recreational activities both in the grounds of private homes and in public park areas has led to considerable interest in outdoor cooking with the result that many home owners have constructed open brick or stone fireplace or barbecue grills on their grounds where various forms of cooking may be done, the grilling or barbecuing of steaks and chops, etc. being particularly popular.

Many homes, however, do not have enough or proper space for the building of such brick or stone fireplace grills. In addition to the fact that the building involves considerable labor many persons would not wish to undertake it because of a lack of knowledge of masonry or brick laying. While skilled builders of such structures might be hired the expense involved might prevent a small home owner from acquiring a structure of this kind to be used merely for amusement or occasional entertaining. Also, in many residential areas the building of such outdoor fireplace or barbecue grills is forbiddent by law.

Because of the foregoing drawbacks to the construction of brick or masonry barbecue grills, many persons purchase portable metal charcoal burners designed for barbecuing. Many and various types of such metal structures are available but these are not entirely satisfactory particularly when it is desired to do other cooking or baking at the same time that the barbecuing operation is being carried ut.

An object of the present invention, in the light of the foregoing, is to provide a new and novel, compact, portable structure for outdoor grill cooking which may be used in most any outdoor location, such as a small garden, picnic grounds, camp site or any other desirable place, whereby grilling or barbecuing operations can be quickly and conveniently performed and baking and other cooking operations may be carried out at the same time by utilizing the heat from the burning fuel in the barbecue pit or pan.

In permanently constructed barbecue grills, and also in portable all metal grills, facilities for performing baking operations are not aways present or, if present they are not such as to make the baking operations of easy accomplishment because the ovens are not located to obtain the fullest benefit from the grill fire. Another object of the present invention is, accordingly, to provide a new and novel portable, outdoor barbecue grill having a bake oven associated therewith in such a manner that adequate heat can be had for the oven from a relatively small fire. In the present structure an oven and grill fire pan are associated so that the floor of the fire pan constitutes the top wall or ceiling of the oven, as a result of which foods in the oven are cooked or baked by strong radiant heat directed downwardly thereon.

Barbecue grills of conventional construction, either the permanent type or the metal portable type, lack efficient means for varying the spacing between the grill platform or grid on which steaks, chops, etc. are being cooked, and the hot coals in the underlying fire bed. Another object, therefore, is to provide a new and novel means for raising and lowering the barbecue rack easily and quickly and securing it at different elevations without risking burning of the hands or fingers.

Another object of the invention is to provide a novel combined bake oven and barbecue grill structure wherein the bake oven has a top opening in which is fitted the fire pan for the barbecue structure or unit and wherein means is provided for conveniently supporting in the fire pan receptacles such as coffee pots or the like in close proximity to the fire bed.

Another object of the invention is to provide a compact unitary bake oven and grill structure wherein the bake oven is provided with hollow or chambered side walls which perform the double function of insulating the oven by providing a dead air space therearound and also provide a convenient housing in which are enclosed raising and lowering elements for upwardly extending supports at opposite sides of the oven upon which the grill rack is mounted.

Still another object of the invention is to provide in a combination structure of the character stated, a novel means for latching the grill rack raising and lowering mechanism in different positions of vertical adjustment.

The foregoing and other objects are attained by the provision of an oven unit having front, back, side and bottom hollow or chambered walls and a top opening. The front wall comprises a fixed upper portion and a movable lower portion, the lower portion constituting a door giving access into the oven. The grill unit forms a unitary cooperating part which for operation or use is not separable from the oven and such grill unit embodies a fire pan which is adapted to position in the top opening of the oven so that the bottom of the pan forms the top wall or ceiling of the oven. The hollow side walls not only provide air spaces around the oven, between the inner and outer panels of the walls but also function as housing means for pivoted bars and levers by which the grid, which overlies the fire pan is vertically adjusted. The grid is removably supported upon uprights or posts connected with the elevating mechanism, which extend upwardly through openings in the tops of the chambered side walls. Such tops of the side walls as well as the front and back walls also function as supporting means for the pan which carries an outwardly extending surrounding flange which rests upon the top edges of the walls whereby, while the fire pan is firmly retained in position and effectively closes the top of the oven, it may be easily and quickly removed for emptying and cleaning.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified within the scope of the appended claims.

In the drawings:

Fig. 1 is a view in perspective of a combined, compact bake oven and grill structure constructed in accordance with the present invention, the grilling grid being shown partly elevated.

Fig. 2 is a view in perspective, on an enlarged scale of one side of the oven and grill structure with portions of the side wall broken away to show a part of the grid elevating mechanism.

Fig. 5 is a partial section, on an enlarged scale, taken substantially on the line 5—5 of Fig. 1.

Fig. 6 is a fragmentary detail illustrating the formation of a portion of the front of the bottom wall and of a portion of the front of a side wall.

Fig. 7 is a bottom perspective of the fire pan.

Fig. 8 is a perspective view of the auxiliary rack adapted to position in the fire pan.

Referring now more particularly to the drawings the numerals 10 and 12 respectively generally designate the oven and grill units of the unitary oven-barbecue grill structure.

Figure 4:
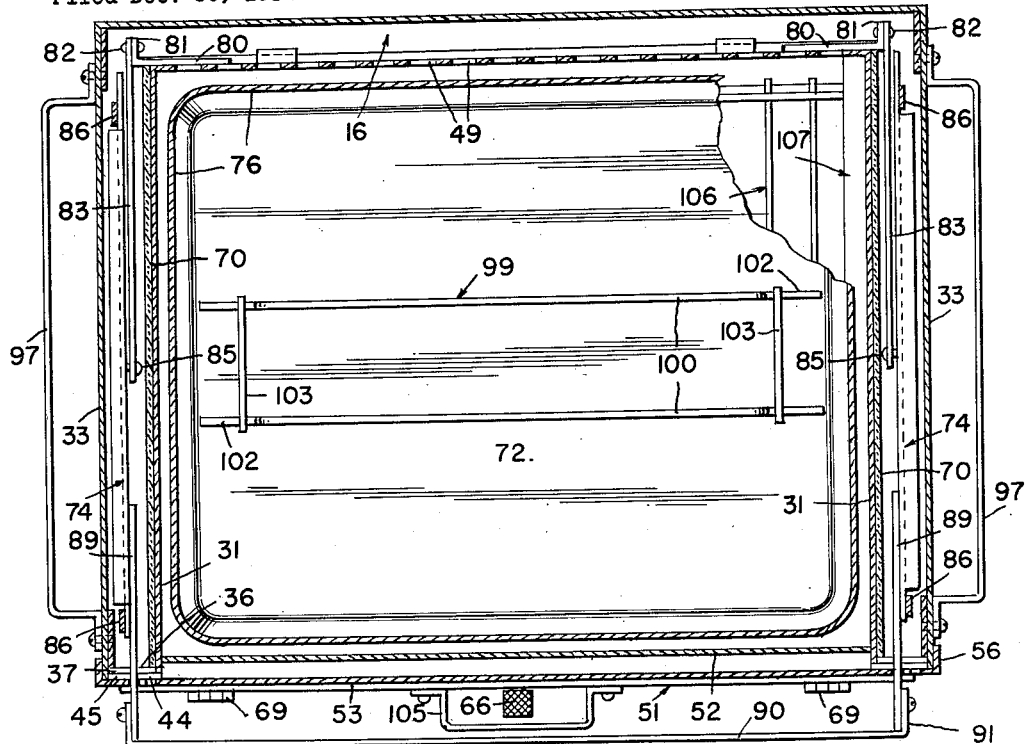
Fig. 4 is a horizontal section taken substantially on the line 4—4 of Fig. 3 looking down as indicated.
Figure 3:
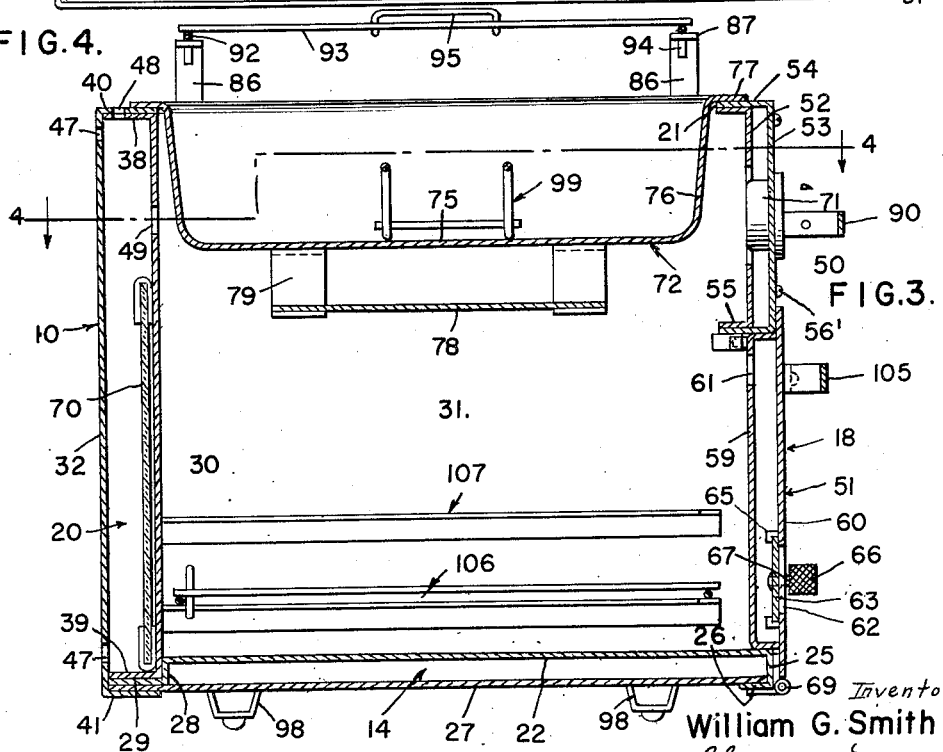
Fig. 3 is a sectional view taken in the vertical front to rear plane indicated by the section line 3—3 on Fig. 1.

The oven unit embodies the bottom wall 14, the side walls 16 and the front and back walls 18 and 20 respectively, which walls are of hollow construction clearly shown particularly in Figs. 3 and 4.

The top of the oven unit or that portion thereof comprised of the wall structures described has the opening 21 which is defined by the tops of the front, back and side walls and which is closed by the hereinafter described fire pan of the grill unit 12.

The bottom wall 14 comprises the floor plate 22 which at opposite sides is defined by the downwardly extending flanges 33 which in turn join the outwardly directed horizontal base flanges 24.

Extending downwardly from the transverse front edge of the floor plate is the facing flange 25 which has the inturned or rearwardly directed base flange portion 26.

In spaced relation with the floor plate 22 is the bottom or base plate 27, the overall width of which is equal to the distance between the outer edges of the lateral flanges 24 and this base plate positions at its side portions against the undersides of the flanges 24 and at its forward portion it rests upon the rearwardly directed flange 26 to which it is secured by welding or the like and it is also secured to the lateral flanges 24 in the same manner together with other parts about to be described.

At the rear of the bottom wall the floor plate 22 has the downturned vertical flange 28 which joins the horizontal rearwardly directed flange 29 and the rear part of the bottom or base plate 27 extends across the underside of this flange 29 as illustrated in Fig. 3.

The side and back walls 16 and 20 include the inner panels 30 and 31 respectively and the outer panels 32 and 33 respectively. The three panels forming the inner sides of the side and back walls and designated 30 and 31 may be formed in one piece of sheet metal of suitable weight if desired and the outer panels 32 and 33 may likewise be formed in one piece of suitable weight sheet metal, although obviously they may be formed as separate parts if desired.

The inner panels 30 of the side walls have out turned top and bottom flanges 34 and 35 respectively and each has at its front edge the outwardly or laterally turned vertical facing flange 36, the upper portion of which has an elongate edge recess 37 therein for the purpose hereinafter described.

The back inner panel 31 likewise has at its top and bottom edges the outwardly directed flanges designated respectively 38 and 39.

As will be readily seen the top and bottom flanges 34 and 35 of the side wall inner panels and the top and bottom flanges 38 and 39 of the back wall inner panel function as spacers between the inner and outer panels of the walls.

The base plate 27 for the bottom wall 14 extends at the rear end across the undersides of the flanges 29 and 39 of the floor plate 22 and back wall inner panel respectively.

The back wall outer panel 32 is bordered along its top and bottom edges by the inturned flanges 40 and 41 respectively and each of the side wall outer panels 33 is bordered along the top and bottom edges respectively by the inturned flanges 42 and 43. In addition each side wall outer panel 33 is bordered along its front edge by the vertical inturned facing flange 44 which adjacent to its top end has formed therein the longitudinally extending recess 45 which is in coinciding or matching relation with the adjacent recess 37, for the purpose hereinafter set forth.

In the set up structure the top and bottom flanges of the side walls outer panels and of the back wall outer panel are in overlapping relation with the adjacent flanges of the inner panels of the side and back walls respectively and the facing flanges 44 are in overlapping relation with the facing flanges 36 to which they are secured in any suitable manner as by means of screws or bolts 46 as shown in Figs. 1 and 2.

The outer panels of the side walls and the outer panel of the back wall have adjacent the top and bottom edges thereof the rows of vent openings 47 and the top flanges 40 and 42 of these panels also have vent openings 48 therethrough which correspond with similar openings in the adjacent flanges of the inner panels. In Fig. 2 the top flange of the inner panel of one side wall is shown as recessed through a portion of its length as indicated at 34′ and as having a central part provided with apertures 34″. These apertures and the recesses 34′ coact with the vents 48 to permit the escape of heated air from the chambered walls as will be readily seen.

The inner panel 30 of the back wall is provided in a separate portion with the transversely extending row of vent openings 49 as shown in Fig. 3 which permits the escape of some of the heated air from the oven chamber C particularly when the hereinafter described control vents in the about to be described door forming portion of the front wall, are opened.

The front wall 18 of the oven unit is divided transversely to provide the fixed upper portion 50 and the lower movable portion 51 which constitutes the door for the oven.

The upper portion 50 of the front wall embodies the spaced inner and outer panels 52 and 53 respectively which have the overlapping top and bottom flanges 54 and 55 while the outer panel 53 has the vertical side edge flanges 56 as shown in Figs. 2 and 3. The top and bottom flanges 54 and 55 forming a part of the outer panel 53 extend the full width of the panel as is clearly shown in Figs. 1 and 2 while the corresponding flanges for the inner panel terminate short of the side flanges 56 to receive the adjacent overlapping face flanges of the inner and outer panels of the side walls.

While the fixed upper portion 50 of the front wall may be secured in place in any suitable manner it is here shown as being held by screws 56′ which are threaded through suitable openings in the panel 53 and into the facing flanges 36—44 lying therebehind.

The inner panel 52 also terminates at its sides short of the side flanges 56, as shown in Fig. 4 to enter between the opposing inner faces of the inner panels 31 of the side walls.

The front wall panel 53 has formed therethrough adjacent each side thereof the vertical slot 57 along one longitudinal edge of which are formed the upwardly facing notched lugs 58 which provide stops for adjustably holding lifting arms associated with the hereinafter described elevating means for the grill grid. These stops are formed along corresponding sides of the two slots 57 as shown most clearly in Fig. 1, that is, as this figures shows the stops in the two slots are formed along the left sides of the slots.

The door forming portion 51 of the front wall structure, like the other walls, is formed to have spaced panels, such panels being here designated 59 and 60, located respectively from the inner and outer sides of the door.

The outer panel 60 is of an overall width and height to overlap at its top and bottom edge portions the fixed upper wall portion 50 and the facing flange 25 at the front of the floor plate 22, while the side portions of the door panel 60 overlap the facing flanges 36. The inner panel 59 accordingly is of smaller dimensions so as to enter the opening provided between the lower part of the fixed wall portion 50 and the floor plate and the inner panels of the side walls as is clearly shown in Fig. 3.

The upper part of the inner panel 59 of the door is provided with a transversely extending row of vent openings 61 and the lower portion of the outer panel 60 is provided with the transversely extending row of vent openings 62.

Suitable means is provided for opening and closing the opening 62, such means being here shown as comprising a slide plate 63 which is provided with openings 64 which may be brought into registry with the opening 62 when the plate is moved horizontally to one position.

The slide plate 63 is supported between suitable guide tracks 65 for sliding movement and to facilitate the shifting of the plate there is provided the button 66 located upon the outer side of the door and connected by a pin 67 through a horizontal slot 68, with the plate.

While the control means for the door vents 62 has been shown and described as a sliding appertured plate, any other suitable means may be employed for opening and closing the apertures such as louvers or the like.

The door 51 is mounted in a suitable manner to facilitate the opening thereof, preference being had for hinges 69 connected between the bottom edge of the outer panel 60 and the bottom plate of the oven as shown in Fig. 3, but a side or top mounting for the door may be employed if desired.

Suitable insulation may be placed between the inner and outer panels of the side and back walls as, for example, sheets 70 of asbestos or any desirable insulation material may be secured against the inner panels in a suitable manner as is illustrated in Figs. 2 and 3, the insulation being so located as not to interfere with the movement of air through the oven vents 49 and the vents 47 in the outer panels of the walls.

For convenience in checking the temperature within the oven whereby the temperature can be regulated by opening and closing the draft openings 62, the panel 53 of the fixed upper part of the front wall has mounted therein a suitable temperature indicator designated 71.

The grill unit 12 comprises the fire pan which is generally designated 72, the grid which is disposed over the fire pan and is generally designated 73, and mechanism for supporting and raising and lowering the grid at each of its sides, which is generally designated 74.

The fire pan 72 comprises the relatively wide, flat bottom portion 75, the side walls 76 rising therefrom and which are very nearly vertical or only slightly sloping outwardly and the outwardly flaring or extending surrounding flange 77 which forms a continuation of the walls 76. The width and length of the pan at the top of the walls corresponds closely to the size of the opening 21 and as is clearly shown in Fig. 3 the pan is adapted to position in the opening with the flange 77 resting upon the tops of the front, back and side walls. The flange 77 is not, however, wide enough to fully cover the top surfaces of the walls upon which it rests, so that the vent openings 48 are unrestricted.

The bottom 75 of the pan together with the sides 76, forms the top or ceiling of the oven chamber C. Accordingly, it will be seen that the fire pan constitutes a part of both the oven and the grill structure.

Disposed in spaced parallel relation with the underside of the pan bottom is a heat baffle plate 78 which is connected to the pan bottom by suitable hangers 79. This baffle plate is shown as being of less width and length than the pan bottom but it will be readily appreciated that the size of the baffle plate can be increased or decreased as may be desired.

The grid raising and lowering mechanism comprises the following structure.

Secured to the inner panel 30 of the back wall adjacent to each vertical edge and between the same and the outer panel is a relatively heavy bracket plate 80 having extending along the outer vertical edge thereof the rearwardly projecting flange 81.

Pivotally attached to the flange 81 by the vertically spaced pivot elements 82 which may be in the form of rivets, bolts, or the like, are the rear ends of two vertically spaced parallel bars 83 which extend forwardly between the inner and outer panels of the adjacent side walls.

Disposed between the panels of each side wall in horizontal position, is the elongate lift plate 84 between which and the adjacent inner panel the bars 83 are positioned and the forward ends of the bars are pivotally attached as at 85 by suitable means such as bolts, pins or the like to the plate 84. The pivots 85 are in a vertical line located midway between the ends of the plate so that the bars 83 are in parallel relation at all times. Pivots 82 at the rear ends of the bars are also in a vertical line which is parallel with the vertical line of the pivots 85. Thus when the bars are swung upwardly or downwardly on their rear supporting pivots 82 the plate will be maintained horizontal while being raised and lowered.

At the forward and rear ends of each plate 84 there is secured a vertically extending lift standard or post 86. These posts are in parallel relation one with the other and are perpendicular to the plate 84 to which the lower ends are rigidly secured as by welding or in any other suitable manner.

The upper ends of the posts or standards 86 have the short inwardly directed tongue portions 87 through which is formed an aperture 88 for the purpose hereinafter set forth.

To facilitate the even or coordinated raising and lowering of the plates 84 from the front part of the oven, each plate has secured to its forward end as by welding, riveting, or in any other suitable manner, the forwardly extending arm 89 which passes through the recesses 37 and 45 of the overlapping flanges 36 and 44 and through the adjacent guide slot 57, terminating at a slight distance beyond the front side of the upper front wall portion panel 50.

To facilitate the raising of the contents of a coffee pot or other receptacle quickly to boiling, when the grill rack 73 is removed there is provided a smaller auxiliary or pot rack generally designated 99 which is designed to position in the fire pan upon the bottom 75 thereof and which is of a height materially less than the depth of the pan. In use the pot rack is placed upon the fire pan bottom and the fuel is then placed in the pan to a depth slightly less than the height of the pot rack so that after the fuel has been lighted the coffee pot or other receptacle can be placed on the rack 99 and be supported with its bottom in close proximity to the hot coals. After the contents of the receptacle have been raised to boiling, the receptacle may then be placed upon the grid after the latter has been mounted on the supporting standards, to be kept boiling or just below the boiling point.

The pot rack 99 is relatively narrow and is here illustrated as comprising two long spaced parallel bars 100 each of which has a downward leg portion 101, at each end which merges with a foot extension 102 which is parallel with the main bar portion 100. These foot portions are connected by a transverse bar 103 placed across and secured to the foot extensions.

To facilitate the opening of the oven door any suitable type of handle may be secured to the face of the outer panel 60, as indicated at 105, and for the support of receptacles in the oven conventional racks 106 may be provided to be supported in the oven upon suitable flanges 107 secured horizontally against the inner panels of the side walls as illustrated in Fig. 3.

From the foregoing, it will be seen that there is provided by the present invention, a compact barbecue grill and oven structure whereby the heat from the bottom of the fire or charcoal pan is utilized to cook foods in the oven, at the same time that meats are being grilled upon the grill rack. With the arrangement of the oven and grill unit of the present invention, the heat from one firing of the charcoal pan will allow several hours of cooking in the oven.

I claim:

1. A barbecue grill and oven, comprising an oven unit embodying bottom, side, front and back walls, the front wall comprising an upper fixed portion and a movable lower portion forming a door giving access into the oven, the oven having a top opening, a fuel pan in and closing said opening, a grill rack adapted to be positioned over the pan, vertical standards at opposite sides of the pan and supporting the grill rack over the pan, means for raising and lowering said standards and the rack thereon as a unit, said side walls being hollow and each embodying an inner panel, said standards having lower end portions extending into the hollow side walls, and said raising and lowering means including an elongate plate member positioned horizontally in each hollow side wall, spaced parallel supporting bars pivotally mounted at one end on the inner panel adjacent the rear thereof and having pivotal connection at their opposite ends with the adjacent plate substantially midway between the ends of the latter, and means connected with the plate members and adapted for actuations from the front of the oven unit for raising and lowering the plate members.

2. The invention according to claim 1, wherein the last stated means comprises two arms each extending forwardly through a vertical slot in the fixed upper portion in the front wall and a bar connecting the forward ends of said arms together, and means for retaining the arms and plates in selected positions of vertical adjustment comprising lugs along one edge of each slot adapted to have an arm engaged thereon.

References Cited in the file of this patent

UNITED STATES PATENTS

| | | |
|---|---|---|
| 2,303,772 | Teichman | Dec. 1, 1942 |
| 2,325,828 | Betts | Aug. 3, 1943 |
| 2,582,720 | Roberts | Jan. 15, 1952 |

FOREIGN PATENTS

| | | |
|---|---|---|
| 5,732 | Great Britain | of 1911 |